United States Patent [19]

Kageyama et al.

[11] Patent Number: 5,227,421
[45] Date of Patent: Jul. 13, 1993

[54] AQUEOUS PIGMENT-DISPERSED PASTE, PROCESSES FOR PRODUCING IT AND THEREFROM WATER PAINT COMPOSITION

[75] Inventors: Hiroyuki Kageyama, Suita; Toshikatsu Kobayashi, Kyoto; Shouji Ikeda, Hirakata, all of Japan

[73] Assignee: Nippon Paint Co., Ltd., Japan

[21] Appl. No.: 970,540

[22] Filed: Nov. 2, 1992

Related U.S. Application Data

[63] Continuation of Ser. No. 692,624, Apr. 29, 1991, abandoned.

[30] Foreign Application Priority Data

May 1, 1990 [JP] Japan .................................. 2-116393

[51] Int. Cl.$^5$ ............................ C08K 3/04; C08K 3/34
[52] U.S. Cl. ..................................... 524/449; 524/495; 524/496; 524/497; 524/555
[58] Field of Search ................ 524/449, 495, 496, 497, 524/555

[56] References Cited

FOREIGN PATENT DOCUMENTS

| | | |
|---|---|---|
| 0056627 | 1/1982 | European Pat. Off. . |
| 50-154328 | 12/1975 | Japan . |
| 59-227940 | 12/1984 | Japan . |
| 60-81252 | 5/1985 | Japan . |
| 60-81253 | 5/1985 | Japan . |
| 60-86171 | 5/1985 | Japan . |
| 60-092360A | 5/1985 | Japan .................................. 524/555 |
| 60-123563 | 7/1985 | Japan . |
| 61-235466 | 10/1986 | Japan . |
| 63-23919 | 2/1988 | Japan . |
| 63-35613 | 2/1988 | Japan . |
| 63-154776 | 6/1988 | Japan . |
| 2029429 | 8/1979 | United Kingdom . |

*Primary Examiner*—Paul R. Michl
*Assistant Examiner*—John J. Guarriello
*Attorney, Agent, or Firm*—Townsend, Snider & Banta

[57] ABSTRACT

A resin having both an acidic and a basic functional group is dissolved in an aqueous medium by neutralizing the acidic functional group with a basic compound and a pigment is dispersed in the aqueous medium by the action of the resin. To improve the dispersibility of the pigment and dispersion stability and coated film performance, a $pK_b$ value of the basic functional group of the resin is equal to or less than a $pK_b$ value of the basic compound.

16 Claims, No Drawings

AQUEOUS PIGMENT-DISPERSED PASTE, PROCESSES FOR PRODUCING IT AND THEREFROM WATER PAINT COMPOSITION

This application is a continuation of application Ser. No. 07/692,624, filed Apr. 29, 1991 now abandoned.

BACKGROUND OF THE INVENTION

The present invention relates to an aqueous pigment-dispersed paste for dispersing beforehand a pigment in an aqueous medium when water paint etc. is produced, and a process for producing it. The invention also relates to a process for producing a water paint composition in which the paste is used.

In producing a water paint, there has been commonly employed an aqueous pigment-dispersed paste in which a pigment has been dispersed in an aqueous medium. This is because, if the whole paint components containing a pigment is dispersed at one time, a dispersing process which usually consumes a lot of energy becomes long and efficiency in production greatly lowers. Because of this, using a dispersing agent, a pigment is beforehand dispersed in an aqueous medium at high concentration with stabilization.

Representative of the dispersing agent is a paste of this type are,

① surface-active agents having a low molecular weight and an anionic, cationic, or nonionic character, and ② polymers (resin) having a medium or high molecular weight.

In the polymer having a medium or high molecular weight are generally known anionic polymers having an acidic functional group such as a (meth)acrylic acid monomer (see, for example, Japanese Official Patent Provisional Publication, showa 50-154328), and cationic polymers having a basic functional group such as a quaternary sulfonium group (for example, refer to Japanese Official Patent Provisional Publication, showa 63-23919). Also, Japanese Official Patent Provisional Publications, showa 59-227940, 60-81252, 60-81253, 60-86171, 60-92360, 60-123563, 61-235466, 63-154776, and 63-35613, disclose that polymers having both of an acidic and a basic functional groups can be used.

The forementioned surface-active agents do not have a sufficient dispersing stability of pigment because of the low molecular weight and are defective on paint film performance such as water-resistance and corrosion-resistance, because the forementioned surface-active agent remains in a coating film.

The paint film performance is improved, using a polymer of a medium or high molecular weight described in the above item ②, and by combining a dispersing agent into a binder component in a coating film. However, the forementioned polymer is generally sulbilized in a water by neutralizing it, in the case of an anionic polymer, with a basic compound in an amount of more than the equivalent and, in the case of a cationic polymer, with an acidic compound in an amount of more than the equivalent. As a result, each aqueous resin solution shows a basic property in the case of the anionic resin and an acidic property in the case of the cationic resin.

As is widely known, pigment particles in various types of aqueous solutions are positively charged when a pH of the aqueous solution is in a region more acidic than an isoelectric point of the pigment and are negatively charged when it is in a region more basic. This is because the isoelectric points of most pigments used for paints are in a neutral region, and an aqueous anionic polymer solution shows a basic character as mentioned above. Thus, the pigment particles are negatively charged and generate an electrostatic repulsive force with a negative electric charge of a resin. As a result, the dispersing stabilization due to adsorption of the resin is insufficient and the dispersibility and dispersion stability of the pigments are unsatisfactory.

Similarly, the pigment is positively charged in a cationic polymer solution and generates an electrostatic repulsive force with a positive electric charge of the resin. As a result, the dispersing stabilization due to adsorption of the resin is insufficient and the dispersibility and dispersion stability are unsatisfactory.

Furthermore, in Japanese Official Patent Provisional Publications, showa 59-227940, 60-81252, 60-81253, 60-86171, 60-92360, 60-123563, 61-235466, 63-154776, and 63-35613, attempts were made to improve the above defects by introducing a basic functional group into an anionic resin. In all these prior arts the same ideas as mentioned below were used, that is, 1) an appropriate balance between hydrophilic and lipophilic domains in resin is most important;

2) the hydrophilicity of the hydrophilic domain is controlled by copolymerizing an acidic and an acrylic monomer;

3) since the resin posses both an acidic and a basic functional groups, a wide range of pigment species are capable of finely dispersing.

However, in these arts a basic compound which is used for neutralizing an acidic functional group involved in the anionic resin is substantially prior in dissociation to a basic functional group involved in a resin and, therefore, an electrostatic attractive force between the resin and pigment is not revealed and the dispersing stability due to resin adsorption is insufficient and the dispersibility and dispersion stability of the pigment are not good.

SUMMARY OF THE INVENTION

Accordingly, the first object of the present invention is to provide an aqueous pigment-dispersed paste which does not cause inferiority in the dispersibility and dispersion stability of the pigment and also, does not badly affect paint film performance. A second object of the present invention is to provide a process for producing such a paste. A third object is to provide a process for producing a water paint composition using the aqueous pigment-dispersed paste.

In order to solve the first object of the present invention, an aqueous pigment-dispersed paste relating to the invention as claimed in claim 1 is such as a pigment, a resin having both acidic functional and basic functional groups, and an aqueous medium are mixed, dissolving the resin into the aqueous medium by neutralizing the acidic functional group of the resin with a basic compound, and also dispersing the pigment in the aqueous medium by the action of the resin; wherein a $pK_b$ value of the basic functional group of the resin is equal to or less than the $pK_b$ value of the basic compound.

To solve the second object of the invention, a process is provided for producing an aqueous pigment-dispersed paste relating to the invention as claimed in claim 2, which comprises dissolving a resin having both acidic functional and basic functional groups in an aqueous medium by neutralizing the acidic functional group with a basic compound, and dispersing a pigment in the aqueous medium by the action of the resin thus producing the aqueous pigment-dispersed paste. In the process, the basic functional group of the resin has a $pK_b$ value equal to or less than the $pK_b$ value of the basic compound.

To solve the third object of the invention, a process is provided for producing a water paint composition relating to the invention as claimed in claim 3, which comprises introducing a pigment in the form of an aqueous pigment-dispersed paste which contains a pigment, a resin having both an acidic functional and a basic functional groups, and an aqueous medium, dissolving the resin in the aqueous medium by neutralizing the acidic functional group with a basic compound, and in which a pigment is dispersed in an aqueous medium by the action of the resin, and the $pK_b$ value of the basic functional group of the resin is equal to or less than the $pK_b$ value of the basic compound.

The present invention is fundamentally different from the prior arts in the following points 1~3 and also, is based on the inventors' original presumption 4.

(1) Whereas in the prior arts the mole amount of acid is less than the mole amount of base, in the present invention the mole amount of acid is equal to or greater than the mole amount of base.

(2) The base strength of a neutralizing base is not specially defined in the prior arts, but in all examples of which the base strength of neutralizing bases is greater than that of the resin.

(3) In the prior arts, a lipophilic (or hydrophobic) monomer such as (meth)acrylic monomer modified with a fatty acid is necessary for obtaining a suitable balance between the hydrophilic and lipophilic domains in a resin.

However, in the present invention a lipophilic monomer is unnecessary.

(4) An acidic functional group is only necessary for solubilizing a resin in water by being neutralized with a suitable amine, and may not be used for adsorption of the resin on a pigment surface, because almost all pigments are negatively charged in the resin solution where the pH value is greater than 8.

In the present invention, the resin which is used as a dispersing agent to disperse a pigment in an aqueous medium is fundamentally a water-soluble resin such as an acrylic resin, a polyester resin, and a polyurethane resin, etc. The resin must contain both an acidic and a basic functional groups in the molecule.

The acidic functional group makes the resin soluble in an aqueous medium by being neutralizing with a basic compound. Because of this, the resin has not only any special limitation, but prefers to have an acidic functional group so that the acid value is in a range of from about 10~200. If the acid value exceeds the upper limit of this range, properties such as water-and corrosion-resistance may deteriorate and, if the acid value is below the lower limit of the range, the resin does not dissolve satisfactorily in water, or its solubility is insufficient. In such a case, a uniform aqueous pigment-dispersed paste may not be obtained. The acidic functional group has a hydrogen atom capable of dissociating such as a carboxyl group or a sulfonic group.

Besides, the basic group dissociates with revealing a positive electric charge in a basic aqueous medium, so that it displays an electrostatic attractive force with a pigment negatively charged in the aqueous medium. Thus, the resin is not especially limited because of the forementioned, but prefers to have a basic functional group so that a base concentration in a solid portion of the resin is in a range of from about 0.1~1.7 mmol/g. If the base concentration exceeds an upper limit of the range, the vehicle viscosity becomes large due to one another's association of the resin molecules and the dispersing may not be possible with a common dispersing mill. If it is less than a lower limit of the range, adsorption with a pigment due to the positive charge of the resin may not substantially take place. The basic functional group is capable of combining with a hydrogen atom. Representative of such basic functional groups is a group containing a nitrogen atom having an unshared electron pair, for example, primary, secondary, and tertiary amino groups and imino groups.

The acidic and basic functional groups of the forementioned resins originated from their monomers. A monomer which provides such an acidic functional group to the resin is, for example, an acrylic acid, methacrylic acid, maleic acid, maleic acid anhydride, phthalic acid, phthalic acid anhydride, succinic acid, succinic acid anhydride, adipic acid, and tetrachlorophthalic acid anhydride. Preferred processes for providing a basic functional group to a resin are, for example, a process for synthesizing an acrylic amphoteric resin using a basic acrylic monomer, which is shown in the following formula:

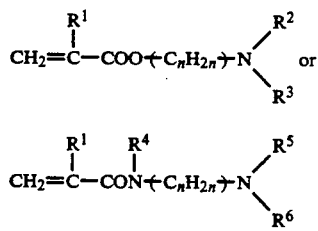

[herein, $R^1$ is s hydrogen atom and $CH_3$, $R^2$~$R^6$ independently is a hydrogen atom or an alkyl group having 6 carbon atoms or less, and n is an integer of 2~8.], and a process for modifying a carboxyl group of a resin by using an imino compound with an aziridinyl group. Each process for providing a monomer containing an acidic functional group or for providing a basic functional group may be used alone or in combination with another suitable process.

Practical examples of a basic acrylic monomer shown in formula I are, for example, N,N'-dimethylaminoethyl (metha)acrylate, N,N-diethylaminoethyl (metha)acrylate, N,N-dimethylaminopropyl (metha)acrylate, N-t-butylaminoethyl (metha)acrylate, and N,N-dimethylaminobutyl (metha)acrylate, etc. Practical examples of a basic acrylate monomer as shown in formula II above are, for example, N,N-dimethylaminoethyl (metha)acrylamide and N,N-dimethylaminopropyl (metha)acrylamide, etc. Practical examples of an imino compound with an aziridinyl group are, for example, 1-aziridineethanol, 3-hydroxypropyl 2-(1-aziridinyl)-propionate, and 2-hydroxyethyl 2-(1-aziridinyl)propionate, etc. (structures of the three compounds are given below).

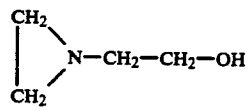

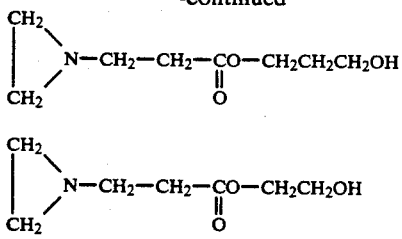

In addition to the above-described monomers containing both an acidic and basic functional groups, another type of a polymerizable monomer may be used as a comonomer. The polymerizable monomer preferably comprises about 10~90% by weight of a solid portion of the resin. A preferred polymerizable monomer is, for example, an ethylenic unsaturated monomer, a polyol compound, polyisocyanate compound, or a polyfunctional epoxy compound.

Polymerization can be carried out using these monomers and the same procedure as used for obtaining a hitherto-known polymer. It is preferred that the mole ratio of the monomer containing a basic functional group to the monomer containing an acidic functional group is in a range of from about 1/10~1/1 (mole ratio). If the mole ratio deviates substantially from this range, adsorption of a resin to a pigment by virtue of the positive electric charge of the resin may not substantially take place, and the resin may not uniformly dissolve in the aqueous medium, when neutralized with a basic compound. In the polymerization reaction, besides the above-described monomers, there can be used water, a water-soluble organic solvent, a polymerization initiator, a polymerization catalyzer, a chain transfer agent, etc. in one kind or in combination of more kinds. After polymerizing each of the monomers containing an acidic and basic functional groups, block polymerization may be carried out or, following after polymerization of either one of the above monomers, graft polymerization of the other monomer can be carried out.

The molecular weight of the resin obtained does not have any special limitation, but it is preferred that the number-average molecular weight is in a range of from about 1,000~100,000. If the number-average molecular weight exceeds an upper limit of the range, the vehicle viscosity becomes large and it may be impossible to form the dispersion. If it is below a lower limit, a resin-adsorbed layer having a thickness sufficient for stabilizing dispersion is not obtained and the dispersibility and dispersion stability may be unsatisfactory and also, there takes place inferiority in a paint film which may occur when a surface-active agent of low molecular weight is used.

A basic compound used for neutralizing the forementioned acidic functional group is an alkanolamine or the other basic compound containing a nitrogen atom, examples of which are a primary amine such as ethanolamine, a secondary amine such as diethanolamine, and a tertiary amine such as triethanolamine and dimethylethanolamine, and one or more of these compounds may be used. Proportions for use of the basic compound are not especially limited, but it is preferred for attaining sufficient solubility of a resin to use at least a 100% neutralization percentage. If the percentage is less than 100%, the solubility of the resin becomes insufficient, the resin precipitates and satisfactory dispersibility and dispersion stability fail to take place.

Besides, the resin and basic compound must be selected so as to satisfy the equation (III), where the $b_1$ is the $pK_b$ value (which is a common logarithm of the inverse of a dissociation constant, which is in turn used to indicate a base strength) of a basic compound used for neutralizing an acidic functional group of the forementioned resin, and $b_2$ is the $pK_b$ of a basic functional group of the resin.

$$b_1 \geq b_2 \qquad (III)$$

The $pK_b$ value of a base is obtained, for example, as follows.

A $pK_b$ value for dissociation in water of a base B is shown as, $$B + H_2O = BH^+ + OH^- \qquad (a)$$

$$pK_b = -\log \frac{[BH^+] \cdot [OH^-]}{[B]} \qquad (b)$$

and, therefore, the following equation is obtained.

$$pK_b = -\log [OH^-] - \log \frac{[BH^+]}{[B]} \qquad (c)$$

At a half equivalent point (a point where a base is neutralized in a ½ amount of the total equivalent number), $$[BH^+] = [B] \qquad (d)$$

Therefore, at the half equivalent point, $$pK_b = -\log [OH^-] \qquad (e)$$

When the dissociation constant of water is shown as $K_w$, $$pK_w = -\log [H^+] \cdot [OH^-] \qquad (f)$$
$$= -\log [H^+] - \log [OH^-]$$

Therefore, the equation (e) becomes $$pK_b = pK_w + \log [H^+] \qquad (g)$$
$$= 14 - pH$$

As shown in the above equations, where a base is neutralized by titrating with a suitable acid, the dissociation constant of the base B, $pK_b$, is obtained from the pH at the half equivalent point.

In the present invention, a pigment used is a coloring agent such as an inorganic pigment, for example, titanium oxide, carbon black, iron oxide; as an organic pigment, for example, quinacridone, phthalocyanine, perylene, and isoindolinone, etc.; an extender pigment such as calcium carbonate, barium sulfate, silica, kaoline, and talc, etc.; anti-corrosive pigment such as zinc chromate and strontium chromate; and it is not especially limited.

The aqueous medium is preferably water and a mixture solution of water and an organic solvent made by dissolving a water-soluble organic solvent in water. In the latter case, the proportion of water to an organic solvent is not especially limited, but the content of the organic solvent is preferably 50% by weight or less of the mixture solution. If it deviates substantially from this range, a suitable manner paint composition may not be formed. Organic solvents which may be used are butylcellosolve and butyldiglycol, etc. If it is water-soluble, it is not especially limited.

The combining proportion of a pigment, the resin, and an aqueous medium is set, for example, as follows. Combining of 10~1000 parts by weight of the resin (hereinafter, the term "a part by weight" is simply referred to as "a part") and 50~5000 parts of the aqueous medium is preferred with 100 parts of the pigment.

If the resin substantially exceeds an upper limit of the above range, coloring by a water paint composition which is obtained by combining this aqueous pigment-dispersing paste may be insufficient. If the resin is lower than a lower limit of the range, pigment-dispersion and dispersion stability may be insufficient. If the aqueous medium sustantially exceeds an upper limit of the forementioned range, because it is required to disperse a large amount of a mill base for dispersing a definite amount of a pigment, efficiency in production may be lower. If it is substantially below a lower limit, viscosity of a dispersing paste becomes high and the dispersing may not be performed by a common dispersing mill.

In the present invention, with the aqueous pigment-dispersing paste, it is possible to combine, in case of necessity, an additive other than the above-described essential components such as a deforming agent, antiseptic, rust inhibitor, and plasticizer, etc. Upon considering the dispersing stability of a pigment, the combining amount of the additive is, for example, 50 parts or less against 100 parts of a pigment.

To prepare an aqueous pigment-dispersed paste, a hitherto-known procedure and device may be used with the forementioned essential components. In the aqueous pigment-dispersed paste thus-obtained, the pigment is well dispersed and this dispersing condition is maintained for a long period, for example, up to about 12 months.

The aqueous pigment-dispersed paste of the present invention has good compatibility with a water-soluble resin, water-dispersed resin, and emulsion, etc. which are commonly used as a vehicle for a water paint, so that the paste is dissolved in these resins to obtain a water paint composition. In this case, it is possible to combine a resin which is used for dispersing the pigment and/or a basic compound which is used for neutralization. By carrying out this procedure, there is a benefit with that pigment aggregation or flocculation resulting from a shock during a dissoluting process can be prevented. A water paint composition can be obtained, for example, using 10~100 parts of an aqueous pigment paste, 10~500 parts of a water-soluble resin, 3~50 parts of a water-soluble or water-dispersed curing agent, and 10~500 parts of an aqueous medium. A water paint composition can be obtained using a process, device, and condition similar to those conventionally used.

A water paint composition thus-obtained is superior in appearance, such as coloring and gloss, as well as in its stability for sedimentation and seeding of a paint.

When the above-described resin is solubilized by neutralizing its acidic functional group with a base, in order to attain sufficient solubility, it is required to carry out the neutralization up to 100% or more. When this neutralization is carried out, the pH of the aqueous medium becomes basic (for example, pH≧8). In general, the relation between an electric charge (ξ potential) of a pigment in an aqueous medium, and the pH of an aqueous medium is that the ξ potential is positive in an acidic region and negative in a basic region. Therefore, in a case where the aqueous medium is basic, an electrostatic attractive force does not work between a residual acidic functional group of the resin (an acidic residue is negatively charged) and a pigment, so that resin adsorption by this attractive force does not take place.

For this reason, both an acidic functional group and a basic functional group are introduced into a resin. However, in a case where only a basic functional group has been introduced into a resin, under an atmosphere where a basic compound used for neutralization coexists, dissociation of a basic compound occurs first, and the basic functional group does not completely dissociate and, as a result, a positive electric charge does not take place in a resin.

If a dissociation equilibrium in a case where two kinds of bases coexist is considered, the following is obtained. The $b_1$ is a $pK_b$ value of the $B_1OH$ and the $b_2$ is a $pK_b$ value of the $B_2OH$.

$$B_1OH \rightleftharpoons B_1^+ + OH^- \qquad (1)$$
$$b_1 = -\log \frac{[B_1^+][OH^-]}{[B_1OH]}$$

$$B_2OH \rightleftharpoons B_2^+ + OH^- \qquad (2)$$
$$b_2 = -\log \frac{[B_2^+][OH^-]}{[B_2OH]}$$

Since the $[OH^-]$ in the above equations (1) and (2) are the same in an identical aqueous medium.

$$\frac{10^{-b_1}}{10^{-b_2}} = \frac{[B_1^+]/[B_1OH]}{[B_2^+]/[B_2OH]}$$

When a relation between the $pK_b$ value ($b_1$) of a basic compound used for the neutralization and the $pK_b$ value ($b_2$) of a basic functional group introduced into a resin is assumed as $b_1 \geq b_2$, the efficiency of dissociating the basic functional group of the resin, thereby revealing a positive charge is as shown as, $$[B_2^+]/[B_2OH] \geq [B_1^+]/[B_1OH]$$

Therefore, the resin becomes positively charged and, by interaction with a negative charge of a pigment, resin adsorption occurs and dispersion stability is attained.

The resin used in the present invention does not adversely affect the coating film performance, which is different from the case of a surface-active agent of low molecular weight. This is because the resin is combined with a binder component in a coating film due to its high molecular weight and is not bled out of the coated film. Also, the resin does not adversely affect the dispersibility and dispersion stability which is different from a case of previous resin described in the item ②. This is because a basic functional group of the resin dissociates and the resulting positive charge from this dissociation causes the resin to be strongly adsorbed to a negative charged pigment. Thus, the aggregation or flocculation of pigment particles is prevented by the resin-adsorbed layer.

In the aqueous pigment-dispersed paste described above, the dispersibility and dispersion stability of a pigment are excellent and do not adversely affect the coated film performance.

In this process for producing an aqueous pigment-dispersed paste, a superior aqueous pigment-dispersed paste as described above can be obtained.

In the process of the present invention for producing a water paint composition, a water paint composition is obtained having high gloss and excellent stability for flooding, floating, and storing.

DESCRIPTION OF THE PREFERRED EMBODIMENTS

Hereafter are practical examples of the present invention together with comparative examples. However, the present invention is not limited to the undermentioned examples. Besides, "a part by weight" is referred to as "a part".

Preparation of polymers A and B

Into a 2 l reaction vessel are placed 480 parts of butylcellosolve, which is then heated to 120° C. Into this, a mixture (A) composed of the following compounds in the proportions indicated was added dropwise during 3 hours and allowed to react under a nitrogen atmosphere.

| | |
|---|---|
| methacrylic acid (MAA) | 72 parts |
| methyl methacrylate (MMA) | 240 parts |
| ethyl acrylate (EA) | 240 parts |
| hydroxyethyl acrylate (HEA) | 240 parts |
| tertiary-butyl peroctate (t-BPO) | 0.8 parts |
| butyl cellosolve (BC) | 100 parts |

The reaction mixture was then kept at 120° C. for 1 hour, whereupon a mixture (B) composed of t-BPO and BC in the proportion of 0.1 parts and 82 parts, respectively, was added dropwise during 30 minutes, whereby a solution of the polymer A having a number-average molecular weight of 23,000 (determined by gel permeation chromatography, GPC, polystyrene standard), an acid value of 62, and a nonvolatile portion of 56% was obtained.

A solution of the polymer A, 400 parts, was placed in a 1 l reaction vessel and heated to 80° C. and, to this solution, a mixture (C) composed of 2-aziridinylethanol and BC in a proportion of 4.26 and 44.26 parts, respectively, was added dropwise during 30 minutes, whereby a solution of the polymer B having an acid value of 49, a nonvolatile portion of 52% having a base concentration of 0.18 mmol/g in a resin solid portion was obtained.

This polymer B has a carboxyl group as an acidic functional group and a tertiary amino group as a basic functional group and, a basic strength $pK_B$ (a common logarithm of an inverse of the base dissociation constant) was 6.0

Preparation of polymer C

The procedure for preparation of the polymer A was repeated, except that a mixture (D) composed of the below-described components was used instead of the mixture (A) in the preparation of polymer A and

| | |
|---|---|
| MAA | 72 parts |
| MMA | 192 parts |
| dimethylaminopropylacrylamide | 48 parts |
| EA | 240 parts |
| HEA | 240 parts |
| t-BPO | 0.8 parts |
| butylcellosolve (BC) | 100 parts |

A mixture (E) composed of 0.1 parts of t-BPO and 160 parts of BC was used instead of the mixture (B), whereby a solution of the polymer C having an acid value of 62, a base concentration of 0.38 mmol/g in a resin solid portion, a number-average molecular weight of 18,000, and a nonvolatile portion of 51% was obtained.

The polymer C has a carboxyl group as an acidic functional group and a tertiary amino group as a basic functional group and, a basic strength $pK_B$ (a common logarithm of an inverse of the base dissociation constant) of the basic functional group was 4.8.

EXAMPLES 1 AND 2 AND COMPARATIVE EXAMPLES 1~3

A water pigment-dispersed paste was prepared in the combination shown in Table 1. Dispersion of the pigment was carried out with stirring at 2000 rpm for 2 hours using a 0.2 l sand mill of a desk type.

The dispersed paste thus-obtained was subjected to a grind gauge test (JIS K5400) to investigate a grain size. Applying a cornplate viscosimeter (a E type, made by Tokyo Keiki Co., Ltd.) to a dispersed paste immediately after production and to a paste stored at 40° C. for 2 weeks under a dispersed paste condition and, varying a shear rate from 1.92 to 384 $sec^{-1}$, viscosity measurements were carried out and yield values were determined using the Casson equation. The grain size and determined yield values are shown in Table 1.

TABLE 1

| | Example 1 | Example 2 | Comparative example 1 | Comparative example 2 | Comparative example 3 |
|---|---|---|---|---|---|
| formulation of aqueous pigment-dispersed paste (part) | | | | | |
| pigment (carbon black: Carbon Raven 410 dense, made by Columbia Chem. Company) | 10 | 10 | 10 | 10 | 10 |
| solution of polymer A (without b$_2$) | — | — | 45.0 | — | — |
| solution of polymer B (b$_2$ = 6.0) | 48.5 | — | — | 48.5 | — |
| solution of polymer C (b$_2$ = 4.8) | — | 49.4 | — | — | 49.4 |
| deionized water | 41.5 | 40.6 | 45.0 | 41.5 | 40.6 |
| basic compound used for neutralization   triethanolamine (b$_1$ = 6.3) | 3.6 | 4.5 | 4.6 | — | — |
| triethylamine (b$_1$ = 3.4) | — | — | — | 2.4 | 3.0 |
| glass beads used for dispersion | 100 | 100 | 100 | 100 | 100 |
| grain size (μm) | less than 5 | less than 5 | 15 | 10 | 15 |

TABLE 1-continued

|  | Example 1 | Example 2 | Comparative example 1 | Comparative example 2 | Comparative example 3 |
| --- | --- | --- | --- | --- | --- |
| yield value (dyne/cm$^2$) (immediately after production) | 0 | 1 | 41 | 27 | 30 |
| yield value (dyne/cm$^2$) (after storing at 40° C. for 2 weeks) | 0 | 2 | 83 | 55 | 71 |

(footnote) A neutralization percentage of a polymer by a basic compound is 110% of an acid equivalent.

In each dispersed paste in Examples 1 and 2, since the base strength $pK_b$ values of a resin used for dispersing a pigment and a basic compound used for neutralization are satisfactory for the relation of equation (III), the grain size was sufficiently small, excellent fluidity was obtained, and deterioration of the fluidity during storage was not observed. On the hand, in Comparative Example a resin lacking a basic functional group was used, and in Comparative Examples 2 and 3 in which the base strength $pK_b$ values of a basic compound used for neutralization and a functional group of the resin used for dispersing a pigment do not satisfy the equation (III), such effects were not obtained and the storage stability was also unsatisfactory.

EXAMPLES 3 AND 4 AND COMPARATIVE EXAMPLES 4~6

Using the dispersed paste in the above examples and comparative examples with the formulations shown in Table 2, a black enamel paint (a water paint composition) was prepared. The enamel paint thus-obtained and also, such as stored at 40° C. for 2 weeks were coated on glass plates using a doctor blade and baked at 150° C. for 30 minutes to obtain coated films.

For each coated film, a 20° specular gloss was measured which is listed in Table 2.

TABLE 2

|  |  | Example 3 | Example 4 | Comparative example 4 | Comparative example 5 | Comparative example 6 |
| --- | --- | --- | --- | --- | --- | --- |
| formulation of black enamel paint (part) |  |  |  |  |  |  |
| aqueous pigment-dispersed paste | kind | Example 1 | Example 2 | Comparative example 1 | Comparative example 2 | Comparative example 3 |
|  | amount | 50 | 50 | 50 | 50 | 50 |
| solution of polymer A (without b$_2$) |  | — | — | 140 | — | — |
| solution of polymer B (b$_2$ = 6.0) |  | 150 | — | — | 150 | — |
| solution of polymer C (b$_2$ = 4.8) |  | — | 154 | — | — | 154 |
| triethanolamine (b$_1$ = 6.3) |  | 11.2 | 14.0 | 14.3 | — | — |
| triethylamine (b$_1$ = 3.4) |  | — | — | — | 7.5 | 9.3 |
| Cymel-303 (registered trademark)*[1] |  | 35 | 35 | 35 | 35 | 35 |
| deionized water |  | 85 | 81 | 95 | 85 | 81 |
| 20° specular gloss |  | 75 | 79 | 44 | 58 | 60 |
| 20° specular gloss (after storing at 40° C. for 2 weeks) |  | 74 | 81 | 32 | 21 | 35 |

(footnote) *[1] a water-soluble melamine resin, made by Mitsui Toatsu Kagaku Co., Ltd.

As seen in Table 2, the paints in Examples 3 and 4 have high gloss, compared with those in Comparative Examples 4~6. The paints in Comparative Examples 4~6 have a decrease in the gloss during storage, whereas those in Examples 3~4 exhibited excellent storage stability.

As illustrated in the examples shown here, better results are obtained in cases where the $pK_b$ value of a basic compound used for neutralizing a later added resin satisfies the equation (III). However, even if the later added base does not satisfy equation (III), the results obtained using a dispersed paste of the present invention were better than those obtained where a dispersed paste such as obtained from Comparative Examples 1~3 was used.

EXAMPLE 5 AND COMPARATIVE EXAMPLE 7

With the combination shown in Table 3, white paints bw and cw were prepared.

TABLE 3

| white paint No. | bw | cw |
| --- | --- | --- |
| solution of polymer A | — | 84.4 |
| solution of polymer C | 90.7 | — |
| triethanolamine | 6.7 | 8.6 |
| Cymel-303 | 20.3 | 20.3 |
| deionized water | 93.7 | 100 |
| Tipaque CR-50 | 45 | 45 |

(footnote) Tipaque CR-50 is a titanium oxide pigment made by Ishihara Sangyo Co., Ltd.

To the white paint bw and to the white paint cw were mixed in proportions shown in Table 4, respectively, the black enamel paint in Example 4 and that in Comparative Example 4, whereby paints of gray color were obtained.

The paints thus-obtained were coated on glass plates using a doctor blade. After coating, the plates were stood for 30 minutes and a part of the coated film was then rubbed with fingers (a rubbing test), and the plates were baked for 30 minutes to obtain cured coated films.

In the cured coated film, the color difference between the part rubbed with fingers and that not rubbed were measured with a color difference meter and results obtained are shown in Table 4.

TABLE 4

|  | Example 5 | Comparative example 7 |
| --- | --- | --- |
| black enamel paint | Example 4 | Comparative example 4 |
| white paint | bw | cw |
| black pigment in black enamel paint versus white pigment in white paint (weight ratio) | 1/9 | 1/9 |

TABLE 4-continued

| color difference (ΔE) | 0.8 | 4.7 |

As shown in Table 4, the paint of Example 5 exhibited small color difference and better stability in color-blending.

Preparation of polymer D

The procedure used for preparation of the polymer A was repeated except that a mixture (F) composed of the below-described components was used instead of the mixture (A) in the preparation of polymer A and,

| MAA | 72 parts |
| MMA | 189 parts |
| dimethylaminoethylmethacrylate | 51 parts |
| EA | 240 parts |
| HEA | 240 parts |
| t-BPO | 0.8 parts |
| buthyl cellosolve | 100 parts | a mixture (E) was used instead of the mixture (B), whereby a solution of the polymer D having an acid value of 62, a base concentration of 0.35 mmol/g in a resin solid portion, a number-average molecular weight of 15,000, and a nonvolatile portion of 51% was obtained. The polymer D has a carboxyl group as an acidic functional group and a tertiary group as a basic functional group and, a basic strength $pK_b$ of the basic functional group was 4.5.

EXAMPLE 6 AND COMPARATIVE EXAMPLES 8 AND 9

An aqueous pigment-dispersed paste was prepared in the formation shown in Table 5. Dispersion of the pigment was carried out with stirring at 1000 rpm for 1 hour using a T. K. Auto Home Mixer Type Am-m (Tokushukika).

For a dispersed paste thus-obtained was carried out a grind gauge test (JIS K5400) to investigate a grain size. The grain size is together shown in Table 5.

TABLE 5

| | Example 6 | Comparative example 8 | Comparative example 9 |
|---|---|---|---|
| formulation of aqueous pigment-dispersed paste (part) | | | |
| pigment (mica flake) (Iriodin 215 WII, Merck) | 40 | 40 | 40 |
| solution of polymer A (without b₂) | — | 45.0 | — |
| solution of polymer D (b₂ = 4.5) | 49.4 | — | 49.4 |
| deionized water | 40.6 | 45.0 | 40.6 |
| basic compound used for neutralization — triethanolamine (b₁ = 6.3) | 4.5 | 4.6 | — |
| triethylamine (b₁ = 3.4) | — | — | 3.0 |
| grain size (μm) | 20 | 60 | 40 |
| storage stability (at 40° C. for 1 week) | settled, but easily redispersed by hand-stirring | hardly settled | hardly settled |

In the dispersed paste in Example 6, since the base strength $pK_b$ value of a resin used for dispersing a pigment and a basic compound used for neutralization are satisfactory for the relation of equation III, the grain size was sufficiently small, and deterioration of the dispersed state during storage was not so serious. On the other hand, in Comparative Example 8 a resin lacking a basic functional group was used, and in Comparative Example 9 in which the base strength $pK_b$ value of a basic compound used for neutralization and a functional group of a resin used for dispersing a pigment do not satisfy the equation III, such effects were not obtained and the storage stability was also unsatisfactory.

What is claimed is:

1. An aqueous pigment-dispersed paste having dispersibility and dispersion stability of the pigment, which comprises a pigment, a resin having both an acidic and a basic functional group, and an aqueous medium, wherein said resin is dissolved in aqueous medium by neutralizing the acidic functional group of said resin with a basic compound, and the pigment being dispersed in the aqueous medium by an action of said resin, said aqueous pigment-dispersed paste having a $pK_b$ value of the basic functional group of the resin equal to or less than a $pK_b$ value of the basic compound.

2. An aqueous pigment-dispersed paste as claimed in claim 1, wherein the pigment is at least one kind selected from a group of carbon black, titanium dioxide, and mica.

3. An aqueous pigment-dispersed paste as claimed in claim 1, wherein the resin is an acrylic resin into which a basic functional group is introduced by copolymerizing at least one of the basic monomers represented by the following formula (I) and (II):

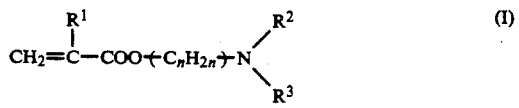

(I)

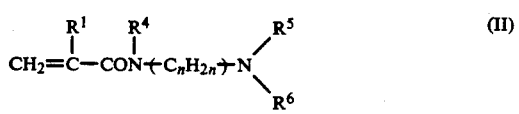

(II)

herein, $R^1$ is a hydrogen atom and $CH_3$, $R^2 \sim R^6$ independently is a hydrogen atom or an alkyl group having 6 carbon atoms or less, and n is an integer of $2 \sim 8$.

4. An aqueous pigment-dispersed paste as claimed in claim 1, wherein the resin is an acrylic resin into which a basic functional group is introduced by modifying a carboxyl group involved in the resin with an imino compound containing an aziridinyl group.

5. An aqueous pigment-dispersed paste as claimed in claim 1, wherein the content of the basic functional group in the resin is set so that the base concentration in a solid particle of the resin is $0.1 \sim 1.7$ mmol/g.

6. An aqueous pigment-dispersed paste as claimed in claim 1, wherein the basic compound used for neutralization is an alkanolamine.

7. An aqueous pigment-dispersed paste as claimed in claim 1, wherein the pH of the aqueous pigment-dispersed paste is 8 or more.

8. A process for producing an aqueous pigment-dispersed paste having dispersibility and dispersion stability of the pigment, which comprises dissolving a resin having both an acidic and a basic functional group in an aqueous medium by neutralizing said acidic functional group of the resin with a basic compound and dispersing a pigment in the resultant aqueous medium by an action of the dissolved resin, said process comprising the resin having the basic functional group, a $pK_b$ value of which is equal to or less than a $pK_b$ value of the basic compound.

9. A process for producing an aqueous pigment-dispersed paste as claimed in claim 8, wherein the pigment is at least one kind selected from a group of carbon black, titanium dioxide, and mica.

10. A process for producing an aqueous pigment-dispersed paste as claimed in claim 8, wherein the resin is an acrylic resin into which a basic functional group is introduced by copolymerizing at least one of the basic monomers represented by the following formula (I) and (II):

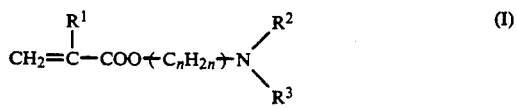

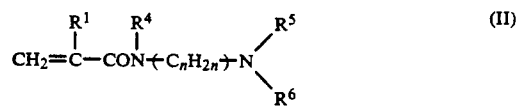

herein, $R^1$ is a hydrogen atom and $CH_3$, $R^2 \sim R^6$ independently is a hydrogen atom or an alkyl group having 6 carbon atoms or less, and n is an integer of $2 \sim 8$.

11. A process for producing an aqueous pigment-dispersed paste as claimed in claim 8, wherein the resin is an acrylic resin into which a basic functional group is introduced by modifying a carboxyl group involved in the resin with an imino compound containing an aziridinyl group.

12. A process for producing an aqueous pigment-dispersed paste as claimed in claim 8, wherein the content of the basic functional group in the resin is set so that the base concentration in a solid portion of the resin is $0.1 \sim 1.7$ mmol/g.

13. A process for producing an aqueous pigment-dispersed paste as claimed in claim 8, wherein the basic compound used for neutralization is an alkanolamine.

14. A process for producing an aqueous pigment-dispersed paste as claimed in claim 8, wherein the pH of the aqueous pigment-dispersed paste is 8 or more.

15. A process for producing a water paint composition in which pigment is combined in the form of an aqueous pigment-dispersed paste as claimed in claim 1.

16. An aqueous pigment-dispersed paste as claimed in claim 1, wherein the mole amount of said acidic functional group is equal to or greater than the mole amount of said basic functional group.

* * * * *